Dec. 5, 1950   M. L. McBRAYER   2,532,929
PRESSURE SENSITIVE MOISTURE TEST INSTRUMENT
Filed Feb. 9, 1949
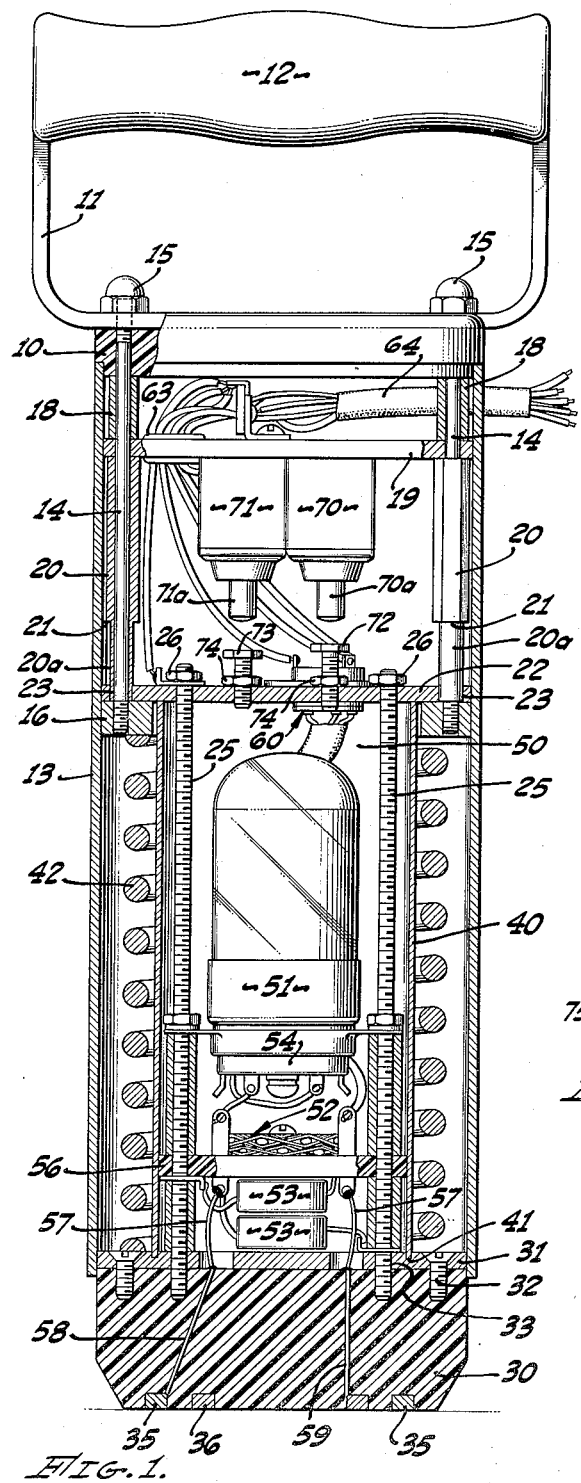
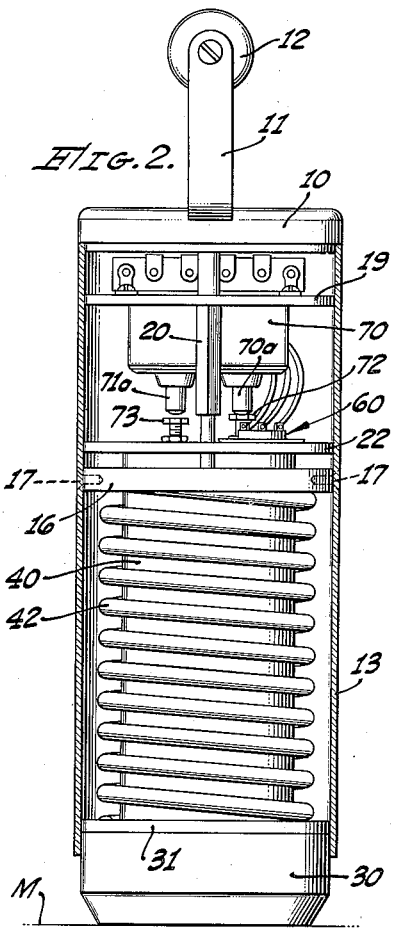
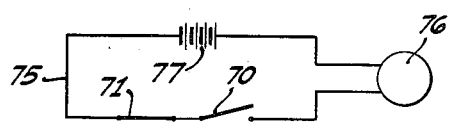
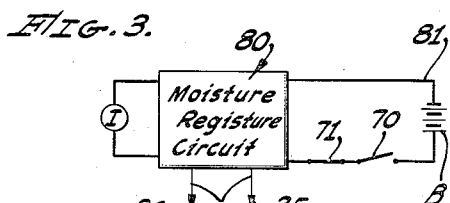
INVENTOR.
MARVIN L. McBRAYER,
BY
ATTORNEY.

Patented Dec. 5, 1950

2,532,929

UNITED STATES PATENT OFFICE 2,532,929

PRESSURE SENSITIVE MOISTURE TEST INSTRUMENT

Marvin L. McBrayer, Alhambra, Calif., assignor to Moisture Register Company, Alhambra, Calif., a corporation of California Application February 9, 1949, Serial No. 75,381

9 Claims. (Cl. 175—183)

This invention relates generally to instruments for determining the moisture content of materials, and more particularly to electrical instruments for such purpose provided with an electric moisture register circuit including electrodes which are applicable to the material. This circuit may establish either a current flow, or an electric field, through the material on test, which current flow or field as the case may be is influenced by the moisture content present in the material, causing a corresponding change in current flow or voltage in the circuit, and a suitable meter connected in said circuit may be calibrated in terms of percentage of moisture present in the material.

There are several varieties of this general circuit, including the resistance type, dependent upon current flow through the material; the dielectric type dependent upon change in dielectric constant with variations in moisture; and the power absorption type, dependent upon variations in power absorbed from a high frequency electric field by the moisture content present. The preferred circuit is of the latter class, and examples thereof are disclosed in prior Patent Number 2,231,035 to Stephens and Dallas. The present invention is applicable, however, to any of the types mentioned.

It is found in the case of instruments of the character referred to, particularly with materials of some degree of compressibility, that there may be some variability of reading with different degrees of contact pressure between the electrodes and the material on test. Thus, first of all, electrical contact resistance varies with contact pressure, giving some increase in reading with increasing contact pressure. Next, the density of the material on test is sometimes increased rather substantially with increasing contact pressure, giving a tendency to higher readings with increasing pressure. Finally, with some types of projecting electrodes, certain materials will be subject to distortion into spaces between the electrodes, giving increasing readings with increasing pressure. Any or all of such effects, or others, lead to unreliability of the readings taken. While these effects are quite negligible with some types of materials, particularly hard and unyielding materials, with others they are so substantial that the readings taken are entirely unreliable.

It is accordingly a primary object of the present invention to provide an improved moisture testing instrument of the general character referred to, in which means are provided for assuring the taking of readings at predetermined contact pressures.

In accordance with the invention, speaking broadly, provisions are made whereby moisture register readings will be taken only at a predetermined degree of contact pressure between the electrode and the material on test. The readings always being taken at this accurately predetermined contact pressure, they will be independent of conditions at other degrees of contact pressure. In accordance with a preferred form of the invention, signal means, including for instance an indicator light, are provided, and are energized when the predetermined degree of contact pressure has been achieved, thus enabling moisture register readings to be taken when that precise pressure has been achieved. In accordance with other variations of the invention, circuit elements of the moisture test instrument are automatically closed to permit operation of the instrument only when the predetermined degree of contact pressure has been achieved. Thus, in the last mentioned embodiment, readings will be given, and can be taken, only when the predetermined contact pressure has been achieved.

It is a further general object of the invention to provide an improved instrument of the general character referred to, including an improved arrangement and means for establishing the predetermined contact pressure at which the readings are to be taken, as well as an improved mounting and location of the high frequency moisture register circuit elements, the provision of shielding means for these high frequency circuit elements, and the provision of improved arrangements for switching the electric circuits in accordance with established contact pressures.

Additional objects and features of the invention will appear and be pointed out in the course of the following detailed description of a present illustrative embodiment of the invention, reference for this purpose being had to the accompanying drawings, in which:

Figure 1 is a longitudinal medial sectional view, with some parts appearing in full elevation, taken through a present preferred embodiment of the invention;

Figure 2 is a view taken at 90° to that of Figure 1, with the exterior casing in longitudinal section, and parts inside thereof in full elevation, the instrument in this instance being shown in operative position with normal application of pressure against a surface of material to be tested;

Figure 3 shows an illustrative signal circuit which may be employed in the invention; and Figure 4 shows diagrammatically an illustrative moisture register circuit including switching arrangements in accordance with the invention.

In the drawings, numeral 10 designates generally an insulation head piece or cap, to the top of which is made fast a handle bracket 11 carrying a handle 12 by means of which the instrument may be manipluated. Fitted to the lower end of cap 10 and projecting downwardly therefrom is a cylindrical casing 13, which is open at its lower end.

A pair of longitudinal mounting rods 14 project through diametrically opposite edge portions of the cap 10 and through the handle bracket 11, the upper end portions of these rods being screwthreaded to accept nuts 15 which are screwed down tightly against the handle bracket in the assembly of the instrument. The lower end portions of these mounting rods 14 are screwthreaded to a mounting ring 16 snugly but slidably fitted inside cylindrical casing 13, and the casing 13 is secured to this ring 16 by means of screws 17. Placed on mounting rods 14 immediately below and in engagement with cap 10 are spacer sleeves 18, the lower ends of which engage a mounting disk 19 for certain later described microswitches, disk 19 being apertured to pass mounting rods 14, and being of a diameter to fit snugly but slidably inside casing 13. Placed on rods 14 between disk 19 and the aforementioned ring 16 are spacer members 20, the cylindrically formed lower portions 20a of which are reduced to provide downwardly facing stop shoulders 21 for a presently described mounting disk. It will be seen that the nuts 15 screwed on the upper ends of rods 14 draw the several described parts connected by said rods tightly into assembly.

An aluminum electrically conductive mounting disk or platform 22, slidable freely inside casing 13, rests normally on top of mounting ring 16, and is apertured, as at 23, to slidably receive the reduced sections 20a of the spacer members 20, so that in the operation of the instrument, the disk 20 may freely move relatively upwardly from ring 16 as high as stop shoulders 21.

The upper end portions of a pair of long screwthreaded mounting rods 25 project through suitable apertures in the mounting disk 22, and carry nuts 26 screwed down against the disk 22. The lower end portions of these mounting rods 25 are screwed into the top of a circular nose block or disk 30 formed of suitable insulation material and receivable with a free sliding fit within the lower end portion of the cylindrical casing 13, from which it projects as indicated in the figures. An aluminum electrically conductive plate or disk 31, of the same diameter as block 30, is secured to the latter by suitable screws 32, and the rods 25 have screwthreaded engagement with screwthreaded apertures 33 in said plate 31.

The nose block 30 carries the electrodes which are applicable to the material to be tested, and while these electrodes may be of various geometrical configurations, they are here shown for illustrative purposes to comprise a pair of rings 35 and 36 embedded in the plane lower end surface of the block, so as to be precisely flush therewith. The nose block 30 normally projects almost wholly from casing 13, but when applied under pressure to a sample of material, such as to the surface M of such a sample (Figure 2), is received or retracted somewhat further inside the casing 13 by an action which will be described presently.

An aluminum electrically conductive sleeve 40 is placed between disks 22 and 31, being seated in a groove 41 sunk in the latter, and this sleeve 40, which is concentric with the exterior casing 13, surrounds the mounting rods 25, and is received just inside the mounting ring 16. A single relatively heavy compression spring 42 surrounds sleeve 40, being positioned in the annular space between said sleeve and the cylindrical exterior casing 13, the upper end of the spring bearing upwardly against the under side of ring 16, and the lower end of the spring bearing downwardly against nose block plate 31. It may now be seen that this spring 42 urges the nose block downwardly to the normal position of Figure 1, in such a manner as to press the disk 22 down against ring 16, and that it yieldingly resists upward movement of the assembly consisting of nose block, mounting rods 25 and mounting disk 22 toward the retracted position of Figure 2.

The high frequency components of the moisture register circuit are contained within the compartment 50 formed by the sleeve 40, the plate 22 and the nose block 30 being mounted on the rods 25. The details of this circuit form no part of the present invention, and will not be given herein, beyond to note that a suitable circuit for the purpose is disclosed in Patent No. 2,231,035 to Stephens and Dallas. Such a circuit, as may be ascertained from reference to said patent, involves the use of a high frequency oscillator including a vacuum tube, such as indicated at 51, tank circuit and output coils such as indicated at 52, and certain condensers such as indicated at 53. The tube 51 is mounted on a base 54 supported as indicated on the mounting rods 25, occupying nicely the compartment space 50 immediately below the mounting disk 22. Below tube 51, on an insulation disk 56 supported on rods 25, are the coils 52, and the condensers such as 53 are then located between the disk 56 and nose block plate 31. The oscillator output leads, indicated at 57, are connected to conductors 58 and 59 extending downwardly through nose block 30 to connect with the aforementioned electrode rings 35 and 36. No attempt is made to show circuit details in the figures since, as already pointed out, these form no part of the present invention, and the only matters of present interest are the convenient accommodation of the physical components within the compartment 50, and the close proximity to the output electrodes.

The high frequency moisture register circuit should, for reasons well appreciated by those skilled in the art, be located in as close proximity as possible to the output electrode elements, giving leads of minimized length, and it will be seen that this desirable condition is well satisfied in the instrument of the present invention. Moreover, it is highly desirable that the high frequency circuit be electrically shielded, particularly from the hands or body of the user, as well as from mechanical elements which may change their position relative to the circuit in the use or operation of the instrument. The aluminum sleeve 40 is designed to serve this purpose, functioning not only as a means centering and positioning the compression spring 42, and as a mechanical spacer for the mounting disk 22 and the nose block 30, but also, acting together with aluminum disks 22 and 31, as an electric shield confining the field of the high frequency moisture register circuit within its boundaries.

It will be seen that the shield constituted by the members 22, 31 and 40 is electrically grounded to the main frame parts of the instrument, and it will be understood to be desirable that the moisture register circuit likewise be grounded to these frame parts or to the shield in accordance with standard practice in apparatus of this character. This is a feature of considerable moment, since without this provision, body capacity, the changing position of the spring 42 in the operation of the instrument, and perhaps other extraneous conditions somewhat difficult to identify, serve to materially disturb the operation of the circuit.

While the high frequency components of the moisture register circuit are contained within the compartment 59, the power source and indicator are external of the instrument, and the appropriate circuit leads are shown as gathered together, passed through disk 22 by means of multiple pin and socket connector 60, extended through an insulation bushing 63 in disk 19, and finally gathered together with certain later described signal circuit leads into a cable 64 extending outwardly through a suitable notch or aperture formed in the top of casing 13.

Mounted on the underside of mounting disk 19 are two microswitches, a normally open switch 70 and a normally closed switch 71 (see also Figure 3), these having downwardly projecting operating plungers 70a and 71a. It will be understood that these microswitches are of a conventional type, well known to those skilled in the art, and that upward movement of the plunger 70a will close the normally open switch 70, while upward movement of the plunger 71a will open the normally closed switch 71. These plungers 70a and 71a are actuated by studs 72 and 73, respectively, threaded into disk 22 and set in proper adjustment by jamb nuts 74. As will be observed from the drawings, the stud 72 is set somewhat higher than the stud 73, and accordingly, as the microswitches are lowered relative to disk 22 in the use of the instrument (casing 13 and parts connected thereto being pushed down by means of handle 12 against the opposition of spring 42) the stud 72 will first be engaged by its corresponding plunger 70a and will cause the same to be depressed a short distance to close the switch 70. Upon a very small degree of additional lowering of the microswitches, the plunger 71a will come into engagement with stud 73 and will be depressed sufficiently by the latter to open the switch 71. There is therefore a small range of position wherein normally open switch 70 is held closed while switch 71 remains closed; with any additional lowering of the microswitches, the circuit is opened at switch 71, and with any elevation thereof, the circuit is reopened at the switch 70. The two switches 70 and 71 are shown in Figure 3 to be connected in a circuit 75 including indicator lamp 76 and battery 77, and it will be clear that the indicator lamp 76 will be illuminated in the described narrow range of positions of the microswitches wherein they are both in closed position.

The operation of the instrument may now be fully understood. Figure 1 is understood to be the normal position of the apparatus. In use, the instrument is pressed down on the surface M of a sample of material, and sufficient pressure is exerted on the handle 12 to compress the spring 42 between the ring 16 carried by casing 13 and the nose block 30 which is in engagement with the sample to such an extent as is illustrated in Figure 2, it being evident that in this action the microswitches are lowered until the microswitch plunger 70a engages the high stud 72, for instance as shown in Figure 2. Upon the exertion of a small degree of additional pressure, the microswitches will move downwardly through a further increment of travel until plunger 70a has been depressed sufficiently into microswitch 70 to close the latter. As already explained, this illuminates the indicator lamp 76, signifying to the operator that the proper predetermined pressure has been applied by the electrode nose block and the material, and that moisture register readings may be taken at the indicating instrument included with the moisture register circuit. If too much pressure is applied, the microswitch 71 will be lowered until its plunger 71a engages stud 73 and is depressed into the switch 71 sufficiently to open the latter and so extinguish the indicator lamp, thus signifying the fact that an excess of pressure has been exerted and that misleading readings would then be given by the moisture register circuit. It is thus possible for the operator to determine with considerable accuracy the proper range of predetermined pressures within which the instrument has been set for accurate readings.

The use of the long spring 42 assures a substantial range of vertical movement for a small pressure change, and therefore such as is required for the described operation of the two microswitches. In practice, the pressure change necessary to depress the instrument between the two switch actuating positions is so small that no change in reading of the moisture register indicator is observable between the time that the indicator lamp 76 first lights up as the switch 70 is closed, and the time that the lamp extinguishes as the switch 71 is opened. The use of the single large heavy spring is of great advantage, in that springs of such size are normally manufactured to remarkably close tolerances. That is to say, springs of this size are found in practice to have highly uniform spring constants, so that in the manufacture of the instrument, a small amount of adjustment of the studs 72 and 73 is all that is required to assure operation of the switches 70 and 71 at the predetermined spring pressures.

Figure 4 shows conventionally a moisture register circuit 80 (which may be of the type disclosed in the aforementioned Stephens and Dallas patent), having indicating instrument I, power circuit 81 including battery B, and output leads 82 understood to be connected to output electrode elements 35 and 36. Figure 4 is illustrative of an embodiment of the invention wherein the normally open microswitches 70 and 71 previously described are included in the moisture register circuit, being in this instance included in series in power circuit 81. It will be understood that in accordance with this embodiment of the invention, the moisture register circuit will be de-energized and inoperative until normally open switch 70 is closed upon application of a predetermined pressure, and will then be operative until switch 71 is opened upon application of a predetermined excessive degree of pressure.

The drawings and description are of course to be taken as merely illustrative of the invention in a present preferred form, and it will be understood that various changes in design, structure and arrangement may be made without de-

I claim:

1. In an electric moisture register instrument: a cylindrical casing open at one end, an electrode supporting block receivable within said open end of said casing, a platform mounted on said block and spaced longitudinally of said casing from said block, a sleeve concentric with said casing mounted between said block and said platform, an annular shoulder in said casing adjacent the inside surface thereof facing toward said open end of said casing, a coil compression spring in said casing surrounding said sleeve and acting between said block and said annular shoulder to resist retractive movement of said block into said casing, means limiting the projection of said block from said casing, and switch means actuated by a predetermined movement of said platform along said casing accompanying retraction of said block into said casing.

2. A combination as defined in claim 1, wherein said switch means is mounted to said casing, and wherein switch actuating means cooperable therewith is mounted on said platform.

3. In an electric moisture register instrument: a cylindrical casing open at one end, an insulation head mounted on and closing the other end of said casing, a mounting ring secured to the inside of said casing at a point between the ends of said casing, an insulation electrode supporting disk receivable with a close sliding fit into the open end of said casing, electrode elements carried by the outer face of said disk, a mounting disk slidably fitted in said casing between said ring and said insulation head, mounting rods connecting said mounting disk and said electrode block, a coil compression spring immediately inside said casing acting between said ring and said electrode supporting disk, said ring normally yieldingly holding said mounting disk against said ring, with said electrode supporting disk in a position of maximum projection from said casing, and switch means positioned in said casing between said insulation head and said mounting disk actuated by a predetermined movement of said mounting disk toward said insulation head accompanying retraction of said electrode supporting disk into said casing.

4. A combination as defined in claim 3, including also a sleeve concentric with said casing clamped between said mounting disk and said electrode supporting disk.

5. A combination as defined in claim 3, including also a sleeve concentric with said casing clamped between said mounting disk and said electrode supporting disk, and electronic moisture register circuit components mounted inside said sleeve and including output leads connected to said electrode elements.

6. A combination as defined in claim 3, wherein said switch means includes a switch supported from said insulation head, and actuating means therefor carried by said mounting disk.

7. In an electric moisture register instrument: a cylindrical casing open at one end, an insulation head mounted on and closing the other end of said casing, a mounting ring secured to the inside of said casing at a point between the ends of said casing, an insulation electrode supporting disk receivable with a close sliding fit into the open end of said casing, electrode elements carried by the outer face of said disk, an electrically conductive face plate on the inside surface of said disk, an electrically conductive mounting disk slidably fitted in said casing between said ring and said insulation head, an electrically conductive sleeve concentric with said casing clamped between said mounting disk and the face plate on said electrode supporting disk, a coil compression spring around said sleeve inside said casing acting between said ring and said electrode supporting disk, said ring normally yieldingly holding said mounting disk against said ring, with said electrode supporting disk in a position of maximum projection from said casing, electronic moisture register circuit components mounted inside the electrically shielded compartment formed by said sleeve, said face plate and said mounting disk, said circuit including output leads connected to said electrode elements, and switch means positioned in said casing between said insulation head and said mounting disk actuated by a predetermined movement of said mounting disk toward said insulation head accompanying retraction of said electrode supporting disk into said casing.

8. A combination as defined in claim 7, including also a signal circuit controlled by said switch means.

9. In an electric moisture register instrument: a cylindrical casing open at one end, an insulation head mounted on and closing the other end of said casing, a shoulder inside said casing facing toward the open end of the casing, an insulation electrode supporting disk receivable within the open end of the casing, electrode elements carried by the outer face of said disk, an electrically conductive face plate adjacent the inside surface of said disk, an electrically conductive sleeve annularly spaced inside said casing and connected at one end to said face plate, an electrically conductive wall closing the other end of said sleeve, means mounting said wall, sleeve and face plate to move with said insulation disk, a coil compression spring in said casing surrounding said sleeve and acting between said insulation disk and said shoulder to resist retractive movement of said disk into said casing, means limiting the projection of the said disk from said casing, electronic moisture register circuit components mounted inside the electrically shielded compartment formed by said sleeve, said face plate and said wall, said circuit components including output leads connected to said electrode elements, and switch means positioned in said casing between said insulation head and said wall actuated by a predetermined retraction into said casing of said electrode supporting disk and parts moving therewith.

MARVIN L. McBRAYER.

REFERENCES CITED

The following references are of record in the file of this patent:

UNITED STATES PATENTS

| Number | Name | Date |
|---|---|---|
| 1,610,563 | McIlvaine | Dec. 14, 1926 |
| 2,063,840 | Fairchild et al. | Dec. 8, 1936 |
| 2,423,552 | Clarke | July 8, 1947 |